United States Patent
Eguchi et al.

(10) Patent No.: US 6,702,715 B2
(45) Date of Patent: Mar. 9, 2004

(54) POWER TRANSMISSION

(75) Inventors: Takahiro Eguchi, Wako (JP); Masaaki Yamaguchi, Wako (JP); Teruo Wakashiro, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/231,233

(22) Filed: Aug. 29, 2002

(65) Prior Publication Data

US 2003/0073538 A1 Apr. 17, 2003

(30) Foreign Application Priority Data

Oct. 17, 2001 (JP) .................................... 2001-318945

(51) Int. Cl.$^7$ .............................................. F16H 61/26
(52) U.S. Cl. ........................... 477/158; 477/39; 477/45; 477/86; 477/156; 477/180
(58) Field of Search ............................... 477/39, 45, 79, 477/80, 86, 97, 121, 156, 158, 174, 175, 180, 902

(56) References Cited

U.S. PATENT DOCUMENTS

| 4,733,580 | A | * | 3/1988 | Kubo et al. ................. 477/129 |
| 5,492,100 | A | * | 2/1996 | Ishii et al. ................... 123/461 |
| 6,138,636 | A | * | 10/2000 | Kohno et al. ............ 123/198 F |
| 2002/0116099 | A1 | * | 8/2002 | Tabata et al. ................... 701/22 |

FOREIGN PATENT DOCUMENTS

| JP | 60256662 A |   | 12/1985 |
| JP | 07239024   | * | 9/1995  |
| JP | 07293685   | * | 11/1995 |

* cited by examiner

Primary Examiner—Ha Ho
(74) Attorney, Agent, or Firm—Fish & Richardson PC

(57) ABSTRACT

A power transmission comprises an engine E with a plurality of cylinders, a belt-type continuously variable transmission CVT, which changes the rotational speed being transmitted from the engine, a control valve CV, which variably sets the line pressure used for controlling the speed change ratio of the transmission, and an electrical control unit ECU, which calculates the torque of the output shaft of the engine when the engine is decelerating in a partial cylinder operation mode. While a vehicle equipped with this power transmission is decelerating with the engine being in a partial cylinder operation mode, the control valve CV sets the line pressure in correspondence to the torque of the engine output shaft calculated by the electrical control unit ECU.

11 Claims, 4 Drawing Sheets

POWER TRANSMISSION

FIELD OF THE INVENTION

The present invention relates to a power transmission that transmits the driving force of an engine comprising a plurality of cylinders, through a ratio-change mechanism to drive wheels. Furthermore, the present invention relates particularly to a power transmission whose ratio-change mechanism is controlled by a line pressure which is set in a characteristic way.

BACKGROUND OF THE INVENTION

Many automobiles are equipped with a power transmission that comprises such a ratio-change mechanism, and generally, the operation of such a ratio-change mechanism is controlled by means of hydraulic pressure. In this arrangement, the pressure of oil being supplied is set at a predetermined pressure (line pressure). For example, Japanese Laid-Open Patent Publication No. S60(1985)-256662 discloses a controller for a belt-type continuously variable transmission, to control the thrusts pushing the belt in the variable widths of the pulleys. In this case, a line pressure is supplied to the hydraulic cylinders used for adjusting the widths of the pulleys, and the line pressure is controlled in correspondence to the output torque of the engine, which torque is calculated from the rotational speed and suction pressure of the engine.

If the line pressure is controlled in correspondence to the output torque of the engine, then the engaging capacity of, for example, a clutch whose operation for the ratio-change mechanism is controlled by the line pressure can be set to a minimum value necessary for transmitting the output torque of the engine to the drive wheels. Therefore, the energy spent by the engine for generating the line pressure can be minimized to improve fuel efficiency. If the engaging capacity of the clutch is set to a minimum value necessary for transmitting the output torque of the engine in this way, then when the output of the engine or the load of the vehicle in travel motion changes abruptly (for example, the accelerator pedal is operated abruptly, or the vehicle is driven over a road-side step), the clutch can slip and prevent the torque being transmitted from changing abruptly. As a result, the vehicle can be improved in maneuverability and driving performance. Furthermore, in the belt-type continuously variable transmission controlled in this way, because the pressure acting on the belt is minimized, the durability of the belt itself can be improved. With such an arrangement, it is also possible to further miniaturize the ratio-change mechanism in a compact design.

Recently, for the purpose of improving fuel economy, vehicles are developed to be equipped with an idling elimination control, in which the operation of the engine is stopped when the vehicle comes into a halt, or with a partial cylinder operation control, in which, under certain driving conditions, some of the cylinders are disengaged from the operation of the engine. In comparison with an all cylinder operation mode, where all the cylinders are used for the operation of the engine, in a partial cylinder operation mode, the output of the engine is smaller because only some of the cylinders are employed for the operation of the engine. Therefore, for example, Japanese Laid-Open Patent Publication No. S59(1984)-13154 discloses a control for increasing the speed change ratio of the ratio-change mechanism used with such an engine which is equipped with disengageable cylinders when the engine is in a partial cylinder operation mode. However, the operation of the engine in a partial cylinder operation mode can occur not only for fuel saving, where the operation of the engine with some cylinders only is intentional, but also accidentally if the controller of the engine operation fails or breaks down and prevents some cylinders from participating in the engine operation.

Furthermore, while the vehicle is cruising, when the accelerator pedal is released, an engine brake is generated, and this brake torque is transmitted through the ratio-change mechanism to the wheels, decelerating the vehicle. For such a deceleration of the vehicle, it is preferable that the control parameters, for example, the line pressure, the transmission-torque capacity of the clutch, and the speed ratio change characteristics of the transmission be determined in correspondence to the engine brake torque (this term is also referred to as "engine friction torque"). Also, it is preferable that the engaging capacities of the clutch, etc. used in the ratio-change mechanism be adjustable appropriately, and that the belt-thrusting pressure and the speed ratio change characteristics of the continuously variable ratio-change mechanism be optimized accordingly. Here, as the engine brake torque differs depending on whether the engine is in an all cylinder operation mode or in a partial cylinder operation mode, the determination process of the control parameters should include such differences into consideration.

Nowadays, there is another type of power transmission in which an electrical motor generator is provided in connection to the output shaft of the engine. This motor generator assists the driving force of the engine as an electrical motor and regenerates energy as an electrical generator when the vehicle is in a deceleration. In such a power transmission, as the regenerating of energy is performed by the electrical motor generator during the deceleration, the torque transmitted through the ratio-change mechanism is determinable from the engine friction torque and the driving torque of the electrical motor generator. Therefore, the control parameters should be determined appropriately in correspondence to the torque values.

SUMMARY OF THE INVENTION

To solve the above mentioned problems, it is an object of the present invention to provide a power transmission which is equipped with an engine capable of operating in a partial cylinder operation mode and which enables appropriate determination of control parameters for a deceleration (the control parameters are, for example, the line pressure, the transmission-torque capacity, and the speed ratio change characteristic of the transmission).

Another object of the present invention is to provide a power transmission which is equipped with an energy-regenerating device and which enables appropriate determination of control parameters for a deceleration.

To achieve these objectives, the present invention provides a power transmission that comprises an engine, a ratio-change mechanism (for example, the belt-type continuously variable transmission CVT described in the following embodiment), a parameter-setting unit (for example, the control valve CV described in the following embodiment), and decelerating torque calculation means (for example, the electrical control unit ECU performing control steps S7 and S29 described in the following embodiment). The engine has a plurality of cylinders, and the ratio-change mechanism transmits the rotational driving force from the engine with a rotational speed change. The parameter-setting unit variably sets control parameters (for example, the line pressure, clutch transmission-torque capacity and ratio-change characteristic of the transmission) for controlling the operation of the ratio-change mechanism, and the decelerating torque calculation means calculates the decelerating torque (output shaft torque) of the engine when the engine is decelerating in a partial cylinder operation mode. While a vehicle equipped with this power transmission is decelerating with the engine operating in a partial cylinder operation mode, the parameter-setting unit sets the control parameters in correspondence to the decelerating torque of the engine calculated by the decelerating torque calculation means.

While the vehicle equipped with the power transmission is decelerating with the engine operating in a partial cylinder operation mode, the force of the engine brake gained from the cylinders not in operation differs from that gained from the cylinders in operation. Therefore, according to a feature of the present invention, the decelerating torque (engine friction torque or engine brake torque) of the engine operating in a partial cylinder operation mode is calculated by the decelerating torque calculation means, and in correspondence to this calculated decelerating torque of the engine, the control parameters, i.e., the clutch transmission-torque capacity, the line pressure, the speed-ratio change characteristic, etc. of the transmission, are set by the parameter-setting unit appropriately for an engine friction torque that is actually generated in this partial cylinder operation mode. Therefore, the engaging capacity of the clutch, etc. of the ratio-change mechanism can be set to a minimum value required for the transmission of the engine friction torque actually generated. This is advantageous in a case where the transmission torque changes abruptly during a deceleration, because the clutch, etc. can slip so as to prevent or restrain the transmission of this abrupt torque change to the drive wheels. Also, this feature of the present invention can be applied to adjust the pressing force of the belt of the ratio-change mechanism to a minimum value necessary so as to improve the durability of the belt and to further miniaturize the construction of the continuously variable ratio-change mechanism.

This power transmission can further comprise an energy-regenerating device (for example, the electrical motor generator M described in the following embodiment), which regenerates and stores energy from the kinetic energy of the vehicle in the deceleration. This energy-regenerating device is connected to the output shaft of the engine. In this case, the power transmission is preferably arranged to operate in such a way that while the vehicle is decelerating with the engine operating in a partial cylinder operation mode, the parameter-setting unit sets the control parameters in correspondence to the decelerating torque of the engine calculated by the decelerating torque calculation means and to the energy-regenerating condition of the energy-regenerating device.

When the power transmission is designed to regenerate energy by the energy-regenerating device during the deceleration of the vehicle, the torque being transmitted from the drive wheels through the ratio-change mechanism to the output shaft of the engine must counteract rotationally the torque of the energy-regenerating device in addition to the engine friction torque. If the clutch capacity, etc. of the transmission were determined in correspondence only to the engine friction torque while energy regenerating is being performed, then the clutch would slip with little rotation being transmitted to the energy-regenerating device. This would result in a greatly reduced efficiency of energy regenerating. Therefore, according to the present invention, the control parameters such as the clutch transmission-torque capacity and the line pressure are set by the parameter-setting unit in correspondence to the decelerating torque of the engine calculated by the decelerating torque calculation means and to the energy-regenerating condition of the energy-regenerating device. In this way, the control parameters are set, so that the rotational driving force from the wheels during the deceleration can be transmitted to the energy-regenerating device without any slip in the clutch, etc. of the ratio-change mechanism. As a result, the energy-regenerating device is operated efficiently, i.e., with no decrease in the energy regenerating efficiency.

Furthermore, if the ratio-change control characteristic of the transmission is also set in correspondence to the decelerating torque calculated accurately, then the ratio-change control characteristic can be set also accurately. Especially, if the inclination of the road where the vehicle is travelling is calculated from the decelerating torque calculated as described above and from the driving resistance, acceleration resistance, etc. of the vehicle, then the inclination of the road can be determined accurately, and this determined inclination of the road can be applied to the arrangement of a speed ratio control map which corresponds accurately to the inclination.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
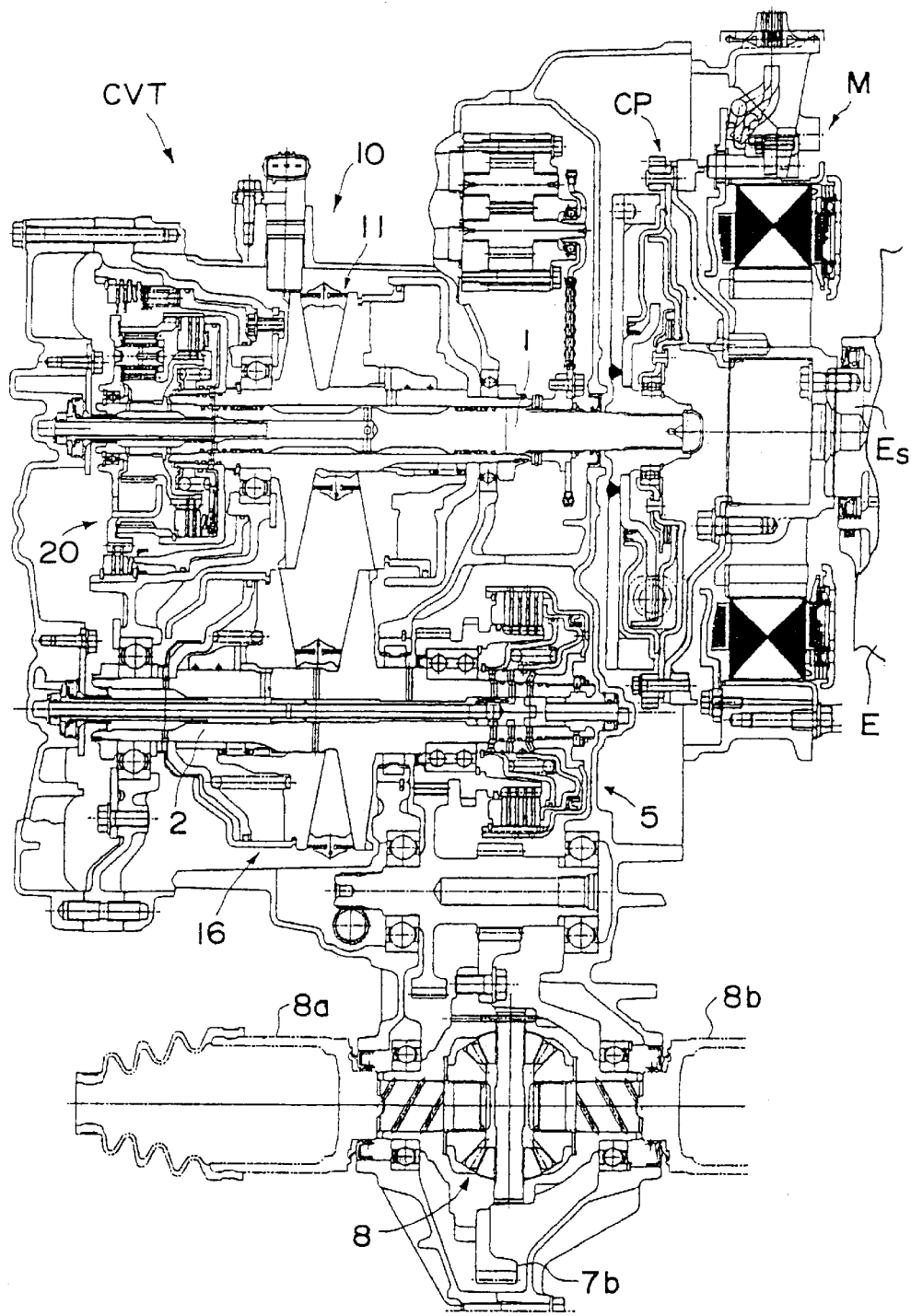
FIG. 1 is a sectional view describing the construction of a power transmission according to the present invention.
Figure 2:
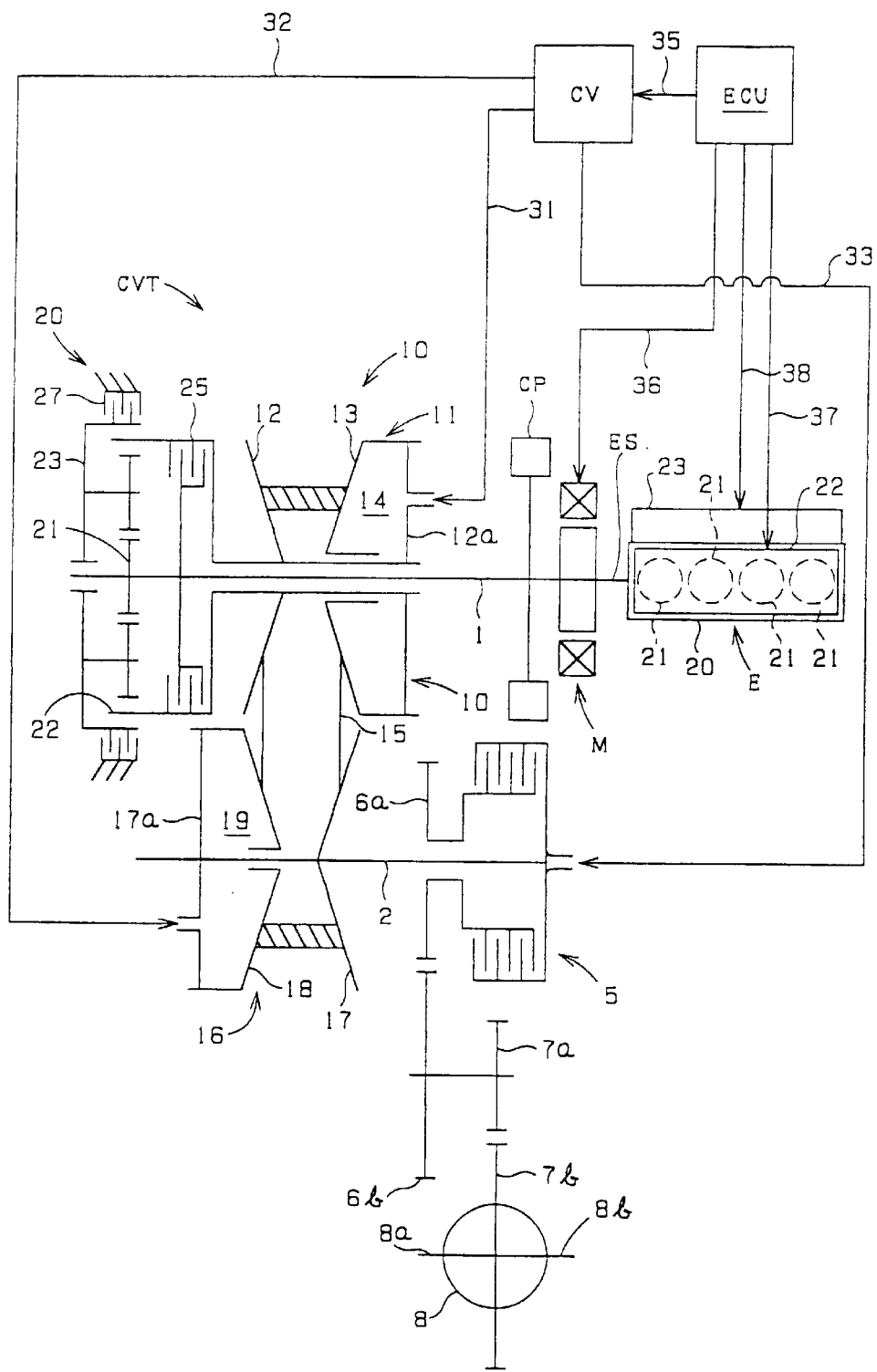
FIG. 2 is a schematic diagram describing the power transmission system of the power transmission.

A preferred embodiment according to the present invention is described in reference to the drawings. FIG. 1 is a sectional view describing the construction of a power transmission as an embodiment according to the present invention, and FIG. 2 shows the power transmission system of this transmission. It is clear from these drawings that this power transmission comprises an engine E, an electrical motor generator M, which is connected to the output shaft Es of the engine E, and a belt-type continuously variable transmission CVT, which is connected through a coupling mechanism CP to the output shaft Es of the engine.

The engine E is a four cylinder reciprocating engine and has a piston in each of the four cylinder bores 21 formed in a cylinder block 20. The engine E is also equipped with a suction and exhaust controller 22, which controls the operation of the suction valves and the exhaust valves for each cylinder bore 21, and with a fuel injection and ignition controller 23, which controls the injection of fuel and the ignition for each cylinder bore 21. The electrical motor generator M assists the driving force of the engine when it is powered by a battery incorporated in the vehicle, and it charges the battery by generating electricity from the rotational drive received from the wheel side while the vehicle is in a deceleration (energy regenerating). Thus, this power transmission has a hybrid-type drive source.

The continuously variable transmission CVT comprises a metal V-belt mechanism 10, a forward/reverse switching mechanism 20 and a starting clutch (main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to a differential mechanism 8 and then used for driving axle shafts 8a and 8b to rotate right and left wheels of the vehicle (not shown).

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the lateral outside of the movable pulley half 13, a drive-pulley cylinder chamber 14 is defined by a cylinder wall 12a, and a pulley-control pressure supplied through a control valve CV and through an oil passage 31 into the cylinder chamber 14 generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the lateral outside of the movable pulley half 18, a driven-pulley cylinder chamber 19 is defined by a cylinder wall 17a, and a pulley-control pressure supplied through the control valve CV and through an oil passage 32 into the cylinder chamber 19 generates a thrust which shifts the movable pulley half 18 in the axial direction of the driven pulley.

In this construction, the hydraulic pressures being supplied into these cylinder chambers 14 and 19 of the drive and driven pulleys, respectively, are controlled by the control valve CV to generate appropriate lateral thrusts in these two pulleys, so that there will be no slip of the belt 15. Furthermore, these pressures supplied into the cylinder chambers are controlled to create a difference in these lateral thrusts, so that the groove widths of these pulleys will change, adjusting the pitch radii of the respective pulleys for the V belt 15. In this way, the speed change ratio of the transmission is controlled to vary continuously without any step. These lateral thrusts, which are generated in the drive and driven pulleys for the ratio control, are generated from a line pressure that is adjusted by a regulator valve from the pressure of a hydraulic pump (not shown) driven by the engine E. More specifically, the pressure of either the drive or driven cylinder chamber that is the higher of the two is produced from the line pressure.

The forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when the forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction). The engagement operation of the forward clutch 25 and the reverse brake 27 is controlled with a forward/reverse control pressure that is adjusted by the control valve CV from the line pressure.

The starting clutch 5 is a clutch to control the power transmission between the countershaft 2 and the output members of the transmission, i.e., power transmission gears 6a, 6b, 7a and 7b. In the condition where the starting clutch 5 is engaged, the output of the engine, after undergoing the speed ratio change by the metal V-belt mechanism 10, is transmitted through the gears 6a, 6b, 7a and 7b to the differential mechanism 8 and then divided and transmitted by the differential mechanism 8 to the right and left axle shafts 8a and 8b and then to the wheels. When the starting clutch 5 is released, this power transmission is terminated, so the transmission is in neutral condition. The engagement of the starting clutch 5 is controlled with a clutch control pressure that is adjusted by the control valve CV from the line pressure and supplied through an oil passage 33.

In this continuously variable transmission CVT, as described above, the pulley-control pressures supplied to the drive and driven pulleys from the control valve CV through the oil passages 31 and 32, respectively, are used for the speed ratio change control while the forward/reverse control pressure supplied to the forward clutch 25 and the reverse brake 27 from the control valve CV through an oil passage (not shown) is used for the forward/reverse switching control of the transmission. In addition, the clutch control pressure supplied from the control valve CV through the oil passage 33 is used for the starting clutch engagement control. The operation of the control valve CV itself is controlled by means of control signals sent from an electrical control unit ECU.

In the vehicle incorporating this transmission, the electrical motor generator M assists the driving force of the engine E, so that the engine E can operate in a range which is most fuel efficient. To improve the fuel efficiency of the vehicle, the operation of the electrical motor M is controlled by means of control signals sent from the electrical control unit ECU through a control line 36. Simultaneously, the speed ratio change control is performed to achieve an optimal speed change ratio for operating the engine E in a most fuel efficient manner. This control is also executed by means of control signals sent from the electrical control unit ECU through a control line 35 to the control valve CV.

Furthermore, the engine E can be operated in a partial cylinder operation mode where some of the four cylinders are set in a stand-by condition when a predetermined condition is satisfied for the vehicle (for example, in a deceleration). More specifically, while the electrical control unit ECU controls the operation of the suction and exhaust controller 22 with control signals sent through a control line 37 and the operation of the fuel injection and ignition controller 23 through a control line 38, to operate the engine in a partial cylinder operation mode, it keeps suction and exhaust valves being closed for some cylinder bores 21 and inhibits these cylinders from receiving fuel injection and ignition. By operating the engine in this way, the fuel efficiency of the vehicle is improved especially during the vehicle's deceleration. In addition, the force of engine brake is made relatively small, so that the energy spent for the deceleration is regenerated effectively by the electrical motor generator M.

In this power transmission, additionally, an idling elimination control is performed to further improve the fuel efficiency. The idling elimination control is basically to stop the operation of the engine itself after the vehicle comes to a halt and when the driving force of the engine becomes unnecessary, i.e., the engine enters into an idling condition. In the idling elimination control executed for this power transmission, to achieve a higher level of fuel efficiency, specifically, when the accelerator pedal is released to decelerate the vehicle and to bring it into a halt, the fuel injection is terminated during the deceleration, and this condition for the engine is kept for elimination of engine idling.

Figure 3:
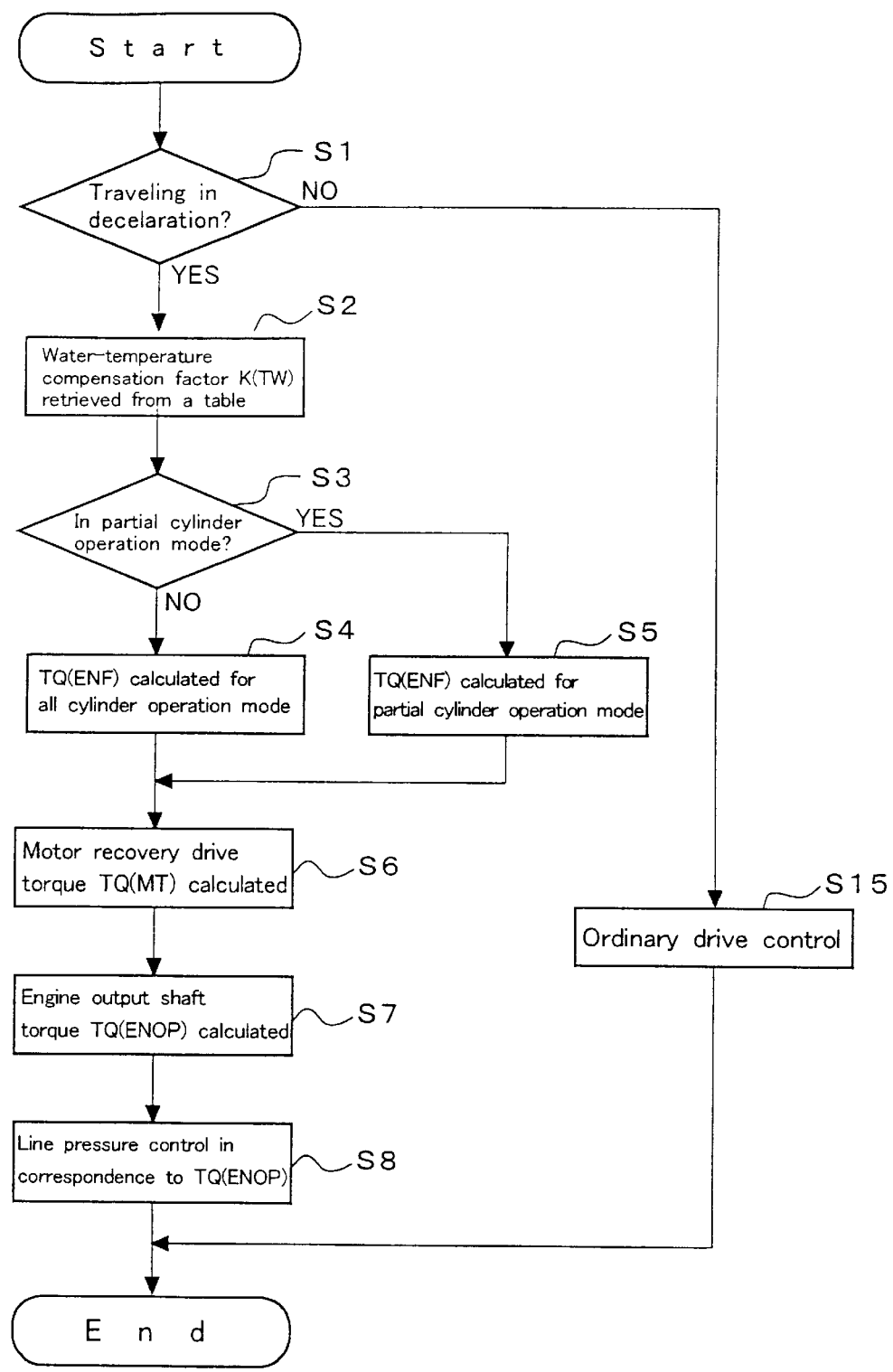
FIG. 3 is a flowchart showing control steps executed for setting the line pressure of the power transmission in correspondence to the torque of the output shaft of the engine during a deceleration.

In the power transmission, which has the above described construction, while the vehicle is in a deceleration, the line pressure is controlled by the electrical control unit ECU through the operation of the control valve CV. Now, this line pressure control is described with respect to the flowchart of FIG. 3. In this control, at first, a determination is made whether or not the vehicle is in a deceleration, i.e., the accelerator pedal is released to decelerate the vehicle, at Step S1. If the vehicle is not decelerating, the control flow proceeds to Step S15, where the power transmission is controlled for an ordinary driving or cruising. The control step performed here is not related to the present invention, so no description is made for this control step.

Conversely, if the vehicle is in a deceleration, then, at Step S2, a water-temperature compensation factor K(TW) for the current condition is retrieved from a table in memory where values of the compensation factor are listed against values of temperature change from the reference temperature of the engine-cooling water. These values in the table are predetermined experimentally from data of changes observed in the engine friction torque (engine brake torque), which changes occur in correspondence to changes in the temperature of the engine-cooling water. As the engine friction torque during the deceleration of the vehicle corresponds to the temperature of the engine-cooling water, this step retrieves the compensation factor K(TW) for the current actual temperature of the cooling water from the table.

Then, at Step S3, a determination is made whether the engine E is in a partial cylinder operation mode or not. If it is not in a partial cylinder operation mode, i.e., it is in an all cylinder operation mode, then the control flow proceeds to Step S4, where the engine friction torque TQ(ENF) for the all cylinder operation mode is calculated. On the other hand, if the engine E is in a partial cylinder operation mode, then the engine friction torque TQ(ENF) for this partial cylinder operation mode is calculated at Step S5. The engine friction torque TQ(ENF) is a driving torque that is transmitted from the output side of the transmission (from the drive wheels) to drive rotationally the output shaft of the engine. Values for the engine friction torque at the reference temperature of the engine-cooling water are predetermined in correspondence to the rotational speed NE and the suction (negative) pressure Pb of the engine for the all cylinder operation mode and the partial cylinder operation mode, respectively, and these values are arranged in a table and stored in memory. Therefore, at these steps, the value for the engine friction torque that corresponds to the current rotational speed NEa and suction pressure Pba of the engine is retrieved from the table, and this value is multiplied by the above described compensation factor K(TW) to gain the engine friction torque TQ(ENF) that corresponds to the current temperature of the cooling water.

While the vehicle is decelerating, if the electrical motor generator M is used to generate electricity for regenerating some energy, then the driving torque TQ(MT) of the electrical motor generator M is calculated at Step S6. This driving torque TQ(MT) is calculated, for example, from the electrical current generated by the electrical motor generator M.

Then, the engine output shaft torque TQ(ENOP) for this deceleration is calculated at Step S7. This engine output shaft torque TQ(ENOP) is the torque of the input shaft 1 of the transmission that is generated from the rotation of the drive wheels during the deceleration of the vehicle to drive the output shaft Es of the engine. Here, the engine output shaft torque TQ(ENOP) is calculated as the sum of the engine friction torque TQ(ENF), which is calculated at Step S4 or Step S5, and the electrical motor generator driving torque TQ(MT), which is calculated at Step S6. Then, at Step S8, the operation of the control valve CV is controlled to adjust and set the line pressure of the transmission correspondingly to the engine output shaft torque TQ(ENOP).

The line pressure set in this way is used for the engagement operation of the starting clutch 5, the forward clutch 25 and the reverse brake 27, so that the engaging capacities of these clutches and brake are set to minimum values required for the transmission of the engine output shaft torque TQ(ENOP). As the line pressure is set to a minimum value required, the driving torque of the hydraulic pump, which generates the line pressure, is also minimized to reduce the fuel consumption of the engine E for driving the pump. Because the engaging capacities of the starting clutch 5, the forward clutch 25 and the reverse brake 27 are set to minimum values required for the transmission of the engine output shaft torque TQ(ENOP), if there is an abrupt increase in the torque being transmitted through these clutches and brake, for example, because of the vehicle's climbing up on a road-side step or an abrupt pressing of the accelerator pedal, these clutches and brake can slip to prevent or restrain fluctuations in the torque. As a result, the driving performance and maneuverability of the vehicle with the power transmission according to the present invention is comparatively high. Furthermore, as the line pressure is used also for generating lateral thrusts in the movable pulley halves of the drive and driven pulleys 11 and 16, the pressures generating these lateral thrusts are adjusted and set to minimum values that are required for the transmission of the engine output shaft torque TQ(ENOP). This results in an improved durability of the belt and also enables a further miniaturization of the drive and driven pulleys 11 and 16.

Figure 4:
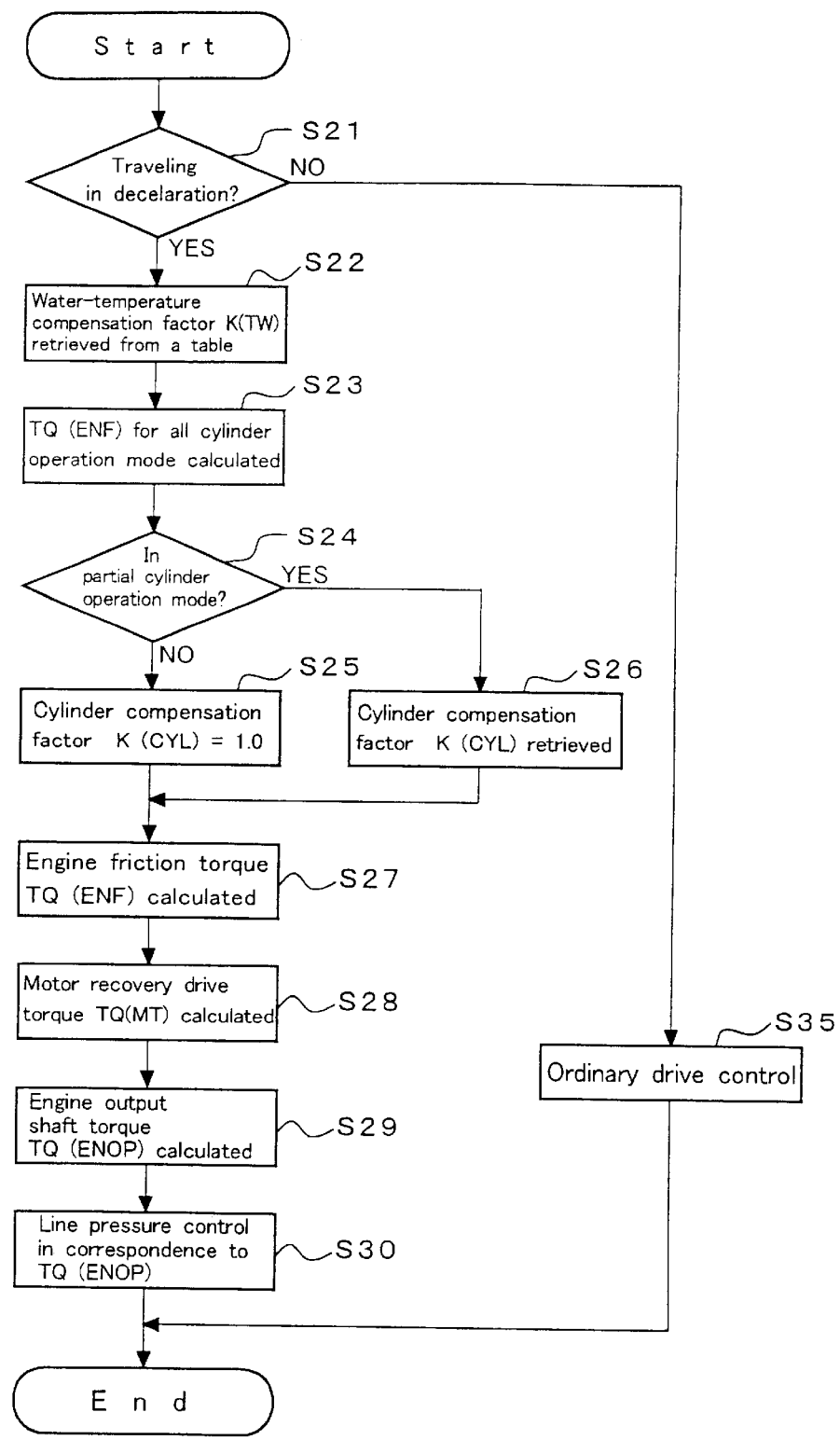
FIG. 4 is a flowchart showing another set of control steps executed for setting the line pressure of the power transmission in correspondence to the torque of the output shaft of the engine during a deceleration.

Another example for controlling the operation of the control valve CV by the electrical control unit ECU to set the line pressure for the power transmission is described in reference to the flowchart of FIG. 4. Also, in this control flow, a determination is made whether or not the vehicle is in a deceleration at the first control step, i.e., Step S21. If the vehicle is not decelerating, the control flow proceeds to Step S35, where the power transmission is controlled for an ordinary driving or cruising.

Conversely, if the vehicle is in a deceleration, then, at Step S22, the water-temperature compensation factor K(TW) for the current condition is retrieved from a table in memory, and at Step S23, for the current rotational speed NEa and suction pressure Pba of the engine, the engine friction torque TQ(ENF) for the all cylinder operation mode at the reference temperature of the cooling water is determined from a table in memory. Then, a determination is made whether the engine E is in a partial cylinder operation mode or not at Step S24. If the engine is in the all cylinder operation mode, then the cylinder compensation factor is set as K(CYL)=1.0 at Step S25. Conversely, if it is in a partial cylinder operation mode, then the cylinder compensation factor K(CYL) that corresponds to this partial cylinder operation mode is retrieved from a predetermined table at Step S26. The values of the cylinder compensation factor K(CYL) for the partial cylinder operation mode are the ratios of values of the engine friction torque in the partial cylinder operation mode to those of the engine friction torque in the all cylinder operation mode at the reference temperature of the cooling water. The values of the cylinder compensation factor K(CYL) are predetermined in correspondence to the rotational speed NE and suction pressure Pb of the engine, and they are arrange in a table and are stored in memory. Therefore, at this step, the cylinder compensation factor K(CYL) that corresponds to the current rotational speed NEa and suction pressure Pba is retrieved from the table.

Then, at Step S27, the engine friction torque for the all cylinder operation mode, which is calculated at Step S23, is multiplied by the water-temperature compensation factor K(TW), which is calculated at Step S22, and by the cylinder compensation factor K(CYL), which is calculated at Step S25 or Step S26, to produce the engine friction torque TQ(ENF).

Then, the driving torque TQ(MT) of the electrical motor generator M is calculated at Step S28, and this driving torque TQ(MT) is added with the engine friction torque TQ(ENF), which is calculated at Step S27, to gain the engine output shaft torque TQ(ENOP) for the deceleration of the vehicle at Step S29. Then, at Step S30, the operation of the control valve CV is controlled, so that the line pressure of the transmission will be adjusted and set correspondingly to the engine output shaft torque TQ(ENOP).

In the above embodiment, the engine E has four cylinders. However, an engine having a different number of cylinders can be equally applicable in an embodiment of the present invention. Also, in the above described embodiment, a belt-type continuously variable transmission is used as a ratio-change mechanism. However, other types of continuously variable transmission as well as gear-type automatic ratio-change mechanisms are applicable to the present invention. Furthermore, as far as the position of the electrical motor generator is concerned, the motor generator can be placed at not only the rear end but also the front end of the output shaft of the engine. It may be placed also over the output shaft of the transmission. Moreover, the present invention may be embodied without a motor generator, as a power transmission having only an engine that is operable in a partial cylinder operation mode.

As described above, according to the present invention, while the vehicle is in a deceleration, the decelerating torque (engine friction torque) of the engine in a partial cylinder operation mode is calculated by decelerating torque calculation means, and in correspondence to this calculated decelerating torque of the engine, a parameter-setting unit sets control parameters (for example, line pressure) appropriately for the engine friction torque that arises actually in the partial cylinder operation mode. Therefore, the engaging capacities of the clutch, etc. of the ratio-change mechanism can be set to a minimum value necessary for transmitting the engine friction torque that arises actually. In a case where the engine torque changes abruptly during a deceleration, the clutch, etc. can slip so as to prevent the transmission of this abrupt torque change to the drive wheels. In this way, no impairment is allow to the driving performance of the vehicle. This feature of the present invention can be applied also to minimize the pressing force of the belt in the ratio-change mechanism so as to improve the durability of the belt. This feature of the present invention also enables a further miniaturization of the continuously variable ratio-change mechanism.

In addition to the construction of the power transmission according to the present invention described above, if an energy-regenerating device is used for regenerating and storing energy from the kinetic energy of the vehicle's deceleration, then the parameter-setting unit sets the control parameters in correspondence to the decelerating torque of the engine calculated by the decelerating torque calculation means and to the energy-regenerating condition of the energy-regenerating device. Therefore, the control parameters are set to transmit the rotational driving force from the drive wheels to the energy-regenerating device without slip at the clutch, etc. of the ratio-change mechanism, so that the energy-regenerating device will operate efficiently without no decrease in the energy-regenerating efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2001-318945 filed on Oct. 17, 2001 which is incorporated herein by reference.

What is claimed is:

1. A power transmission comprising:
    an engine which includes a plurality of cylinders;
    a ratio-change mechanism, which transmits a rotational driving force from said engine with a rotational speed change;
    a parameter-setting unit which variably sets control parameters for operating said ratio-change mechanism; and
    decelerating torque calculation means for calculating a decelerating torque of said engine when said engine is decelerating in a partial cylinder operation mode, where operation of some of the cylinders is stopped;
    wherein:
        while said engine is decelerating in said partial cylinder operation mode, said parameter-setting unit sets said control parameters in correspondence to the decelerating torque of said engine calculated by said decelerating torque calculation means.

2. The power transmission as set forth in claim 1, further comprising an energy-regenerating device, which regenerates and stores energy from kinetic energy of a vehicle in deceleration, said energy-regenerating device being connected to an output shaft of said engine;
   wherein:
   while said engine is decelerating in said partial cylinder operation mode, said parameter-setting unit sets said control parameters in correspondence to the decelerating torque of said engine calculated by said decelerating torque calculation means and to an energy-regenerating condition of said energy-regenerating device.

3. The power transmission as set forth in claim 2, wherein:
said energy-regenerating device comprises an electrical motor generator;
when said electrical motor generator is driven through the output shaft of said engine, electricity is generated to charge a battery; and
when said electrical motor generator is driven by said battery, said electrical motor generator can assist said engine.

4. The power transmission as set forth in claim 2, wherein:
operation of said ratio-change mechanism is controlled hydraulically;
said parameters includes line pressure supplied to said ratio-change mechanism; and
said parameter-setting unit sets said line pressure in correspondence to the decelerating torque of said engine or in correspondence to the decelerating torque of said engine and to the energy-regenerating condition of said energy-regenerating device.

5. The power transmission as set forth in claim 4, wherein:
said ratio-change mechanism comprises a continuously variable ratio control mechanism; and
said line pressure is used for continuous ratio-change control of said continuously variable ratio control mechanism.

6. The power transmission as set forth in claim 2, wherein:
said ratio-change mechanism comprises a frictionally engaging element whose transmission-torque capacity is variable;
said parameters include said transmission-torque capacity; and
said parameter-setting unit variably sets said transmission-torque capacity of said frictionally engaging element in correspondence to the decelerating torque of said engine or in correspondence to the decelerating torque of said engine and to the energy-regenerating condition of said energy-regenerating device.

7. The power transmission as set forth in claim 6, wherein:
said frictionally engaging element comprises a hydraulic clutch, which is placed in said ratio-change mechanism and controls transmission of output of said engine to wheels; and
said parameter-setting unit variably sets actuation pressure of said hydraulic clutch in correspondence to the decelerating torque of said engine or in correspondence to the decelerating torque of said engine and to the energy-regenerating condition of said energy-regenerating device.

8. The power transmission as set forth in claim 2, wherein:
said ratio-change mechanism is operated in an automatic ratio-change mode on a basis of ratio-change characteristic;
said parameters include said ratio-change characteristic; and
said parameter-setting unit variably sets said ratio-change characteristic in correspondence to the decelerating torque of said engine or in correspondence to the decelerating torque of said engine and to the engine-regenerating condition of said energy-regenerating device.

9. The power transmission as set forth in claim 1, wherein:
said decelerating torque calculation means calculates the decelerating torque of said engine in correspondence to a current rotational speed and a suction pressure of said engine on a basis of data which are predetermined and stored in memory for the rotational speed NE and suction pressure Pb of said engine.

10. The power transmission as set forth in claim 9, wherein:
said decelerating torque calculation means detects a temperature of cooling water used for said engine and compensates the decelerating torque of said engine in correspondence to said temperature of the cooling water.

11. The power transmission of claim 5 wherein:
the continuously variable ratio control mechanism includes a belt.

* * * * *